(12) United States Patent
Humber et al.

(10) Patent No.: US 7,441,729 B2
(45) Date of Patent: Oct. 28, 2008

(54) J-HOOK HANGER ASSEMBLY

(75) Inventors: Jeffrey A. Humber, Memphis, TN (US); Steven R. Cole, Collierville, TN (US)

(73) Assignee: IPS Corporation, Collierville, TN (US)

( * ) Notice: Subject to any disclaimer, the term of this patent is extended or adjusted under 35 U.S.C. 154(b) by 83 days.

(21) Appl. No.: 11/208,827

(22) Filed: Aug. 22, 2005

(65) Prior Publication Data

US 2007/0040074 A1  Feb. 22, 2007

(51) Int. Cl.
*F16L 3/00* (2006.01)
(52) U.S. Cl. .......................... 248/58; 248/59
(58) Field of Classification Search .................. 248/58, 248/59, 62, 317, 307, 327, 159, 125.8, 161
See application file for complete search history.

(56) References Cited

U.S. PATENT DOCUMENTS

| | | | | |
|---|---|---|---|---|
| 1,784,244 A * | 12/1930 | Morris | ......................... | 248/55 |
| 2,161,782 A * | 6/1939 | Flower | ......................... | 248/59 |
| 2,339,565 A * | 1/1944 | Goldberg et al. | ............... | 248/62 |
| 2,671,232 A * | 3/1954 | Brancel | ....................... | 114/364 |
| 3,559,910 A * | 2/1971 | Babb | ........................... | 248/59 |
| 3,718,307 A * | 2/1973 | Albanese | ...................... | 248/57 |
| 4,407,478 A * | 10/1983 | Hodges | ....................... | 248/542 |
| 5,221,064 A * | 6/1993 | Hodges | ........................ | 248/59 |
| 5,350,141 A * | 9/1994 | Perrault et al. | ................. | 248/59 |
| 5,385,320 A * | 1/1995 | Ismert et al. | ................... | 248/62 |
| 5,542,631 A * | 8/1996 | Bruno | .......................... | 248/58 |
| 5,746,401 A * | 5/1998 | Condon | ....................... | 248/62 |
| 5,845,882 A * | 12/1998 | Hodges et al. | ................. | 248/59 |
| 5,890,683 A * | 4/1999 | DePietro | ...................... | 248/58 |
| 6,575,416 B1 * | 6/2003 | Avinger | ....................... | 248/307 |

* cited by examiner

Primary Examiner—Anita M King
(74) Attorney, Agent, or Firm—Gauthier & Connors, LLP

(57) ABSTRACT

A hanger assembly for suspending a pipe from a support comprises a J-hook engageable with the pipe. The hook has a vertically extending shank. A shank extension has a leg projecting vertically from a sleeve. The shank of the J-hook is configured and dimensioned for axial insertion to a selected extent into the sleeve. First fasteners serve to secure the thus inserted shank within the sleeve, and second fasteners serve to attach the leg to the support.

3 Claims, 1 Drawing Sheet

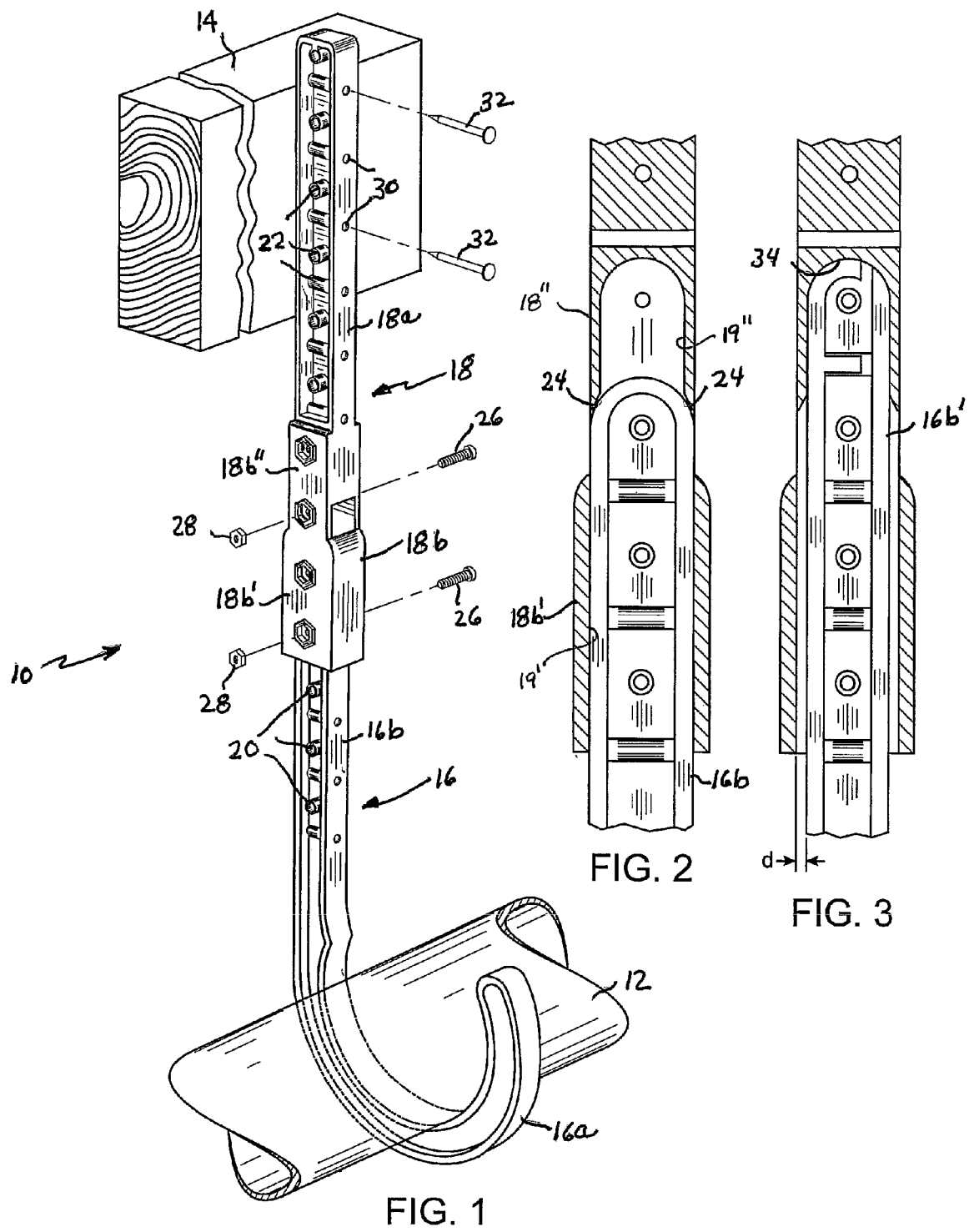

J-HOOK HANGER ASSEMBLY

BACKGROUND OF THE INVENTION

1. Field of the Invention

This invention relates to J-hook carriers for suspending pipes and other like conduits from support structures, and is concerned in particular with an assembly of a J-hook carrier and an extension of its shank.

2. Description of the Prior Art

Conventional J-hook carriers have shanks configured for attachment by screws, nails, etc. to beams, floor joists or the like. In certain installations, however, the length of the shanks is insufficient to accommodate the required pitch of the conduits. In the past, when faced with this problem, construction personnel have had to resort to other less convenient carrier arrangements.

SUMMARY OF THE INVENTION

In accordance with the present invention, a hanger assembly for suspending a pipe from a support comprises a J-hook engageable with the pipe. The hook has a vertically extending shank. A shank extension has a leg projecting vertically from a sleeve. The shank of the J-hook is configured and dimensioned for axial insertion to a selected extent into the sleeve. First fasteners serve to secure the thus inserted shank within the sleeve, and second fasteners serve to attach the leg to the support.

A preferred embodiment of the invention will now be described in greater detail with reference to the accompanying drawings, wherein:

BRIEF DESCRIPTION OF THE DRAWINGS

FIG. 1 is a perspective view of a hanger assembly in accordance with a preferred embodiment of the present invention;

FIG. 2 is a sectional view showing one shank size of a J-hook inserted into the sleeve of the extension; and FIG. 3 is a sectional view similar to FIG. 2 showing a smaller shank size of a J-hook inserted into the sleeve of the extension.

DETAILED DESCRIPTION OF THE INVENTION

With reference initially to FIG. 1, a hanger assembly 10 is shown in an operative environment suspending a pipe 12 from a support beam 14. The assembly includes a J-hook 16 having a curved lower segment 16a engaging the pipe 12, and a vertically extending shank 16b. 1

A shank extension 18 has a leg 18a projecting vertically from a sleeve 18b. The sleeve has a stepped configuration, with a lower end 18b' that is wider than an upper end 18b". As can be best seen in FIG. 2, the lower end 18b' defines a lower passage 19' leading to a narrower upper passage 19" in the upper end 18".

The shank 16b and sleeve 18b are provided, respectively, with vertically spaced first and second sleeve-shaped openings 20, 22 arranged in a common plane. FIG. 2 shows one shank size inserted into the wider lower end 18b' of sleeve 18, with its nose bearing against stop shoulders 24 in the narrower upper end of the sleeve. When thus inserted, selected first and second openings 20, 22 are transversally aligned to received first fasteners, e.g. screws 26 coacting with nuts 28. The leg 18a of the shank extension has vertically spaced third openings 30 extending orthogonally with respect to the common plane of the first and second openings 20, 22. The third openings 30 are arranged to accept second fasteners 32 which secure the leg 18a to the support beam 14.

FIG. 3 shows the sleeve 18b accepting a narrower J-hook shank 16b'. The shank 16b' extends into the narrower upper section 18b" of the sleeve, with its nose bottoming out at 34.

The additional length provided by the shank extension 18 provides enhanced vertical adjustment of the J-hook 16 and the pipe 12 supported thereon, thus enabling installers to accommodate required pitches over longer pipe lengths.

What is claimed is:

1. A hanger assembly for suspending a pipe from a support, said assembly comprising:

a hook for engaging the pipe, said hook having one or the other of two vertically extending shanks of differing widths; a shank extension having a leg projecting vertically from a sleeve, said sleeve having a stepped configuration defining a lower passage leading to an upper passage that is narrower than said lower passage, said lower passage being configured and dimensioned to receive one shank that is wider than said upper passage, and said upper passage being configured and dimensioned to receive another shank via said lower passage that is narrower than said lower passage; first fastening means for securing the one or the other of said shanks within said sleeve; and second fastening means for attaching said leg to the support.

2. The hanger assembly of claim 1 wherein the one or the other of said shanks and said sleeve are provided respectively, with vertically spaced first and second openings arranged in a common plane, and wherein said first fastening means are received in selected mutually aligned first and second openings.

3. The hanger assembly of claim 2 wherein said leg is provided with vertically spaced third openings perpendicular to said plane, said second fastening means extending through said third openings.

* * * * *